L. C. WEYAND.
SEAL PADLOCK.
APPLICATION FILED APR. 29, 1909.

1,048,438.

Patented Dec. 24, 1912.

Witnesses:
Frank Blanchard
Edna R. Reynolds

Inventor:
Lawrence C. Weyand
By Parker & Carter
Attorneys.

UNITED STATES PATENT OFFICE.

LAWRENCE C. WEYAND, OF CHICAGO, ILLINOIS, ASSIGNOR TO BATTENBERG CAR SEAL AND EQUIPMENT CO., A CORPORATION OF ILLINOIS.

SEAL-PADLOCK.

1,048,438.  Specification of Letters Patent.  Patented Dec. 24, 1912.

Application filed April 29, 1909. Serial No. 492,811.

*To all whom it may concern:*

Be it known that I, LAWRENCE C. WEYAND, a citizen of the United States, residing at Chicago, in the county of Cook and State of Illinois, have invented a certain new and useful Improvement in Seal-Padlocks, of which the following is a specification.

This invention relates to seal padlocks, and has for its object to provide a new and improved lock of this description.

The invention is illustrated in the accompanying drawings, wherein—

Figure 1:
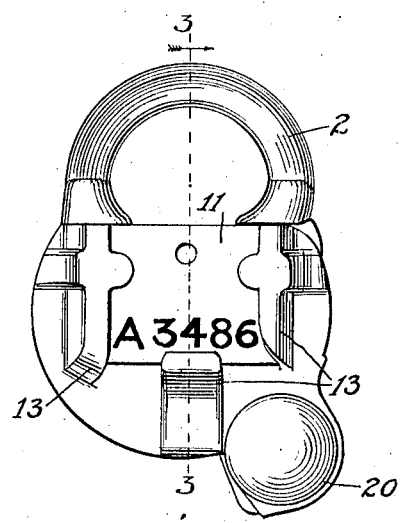
Figure 2:
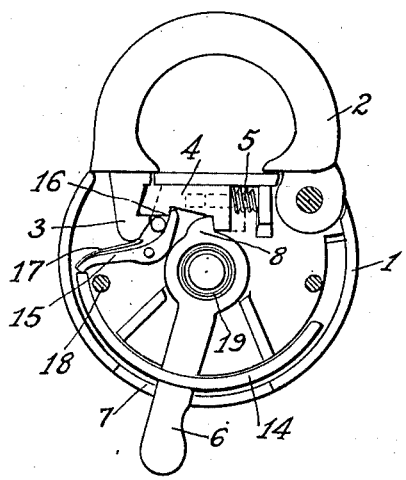
Figure 4:
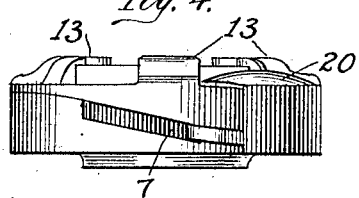
Figure 3:
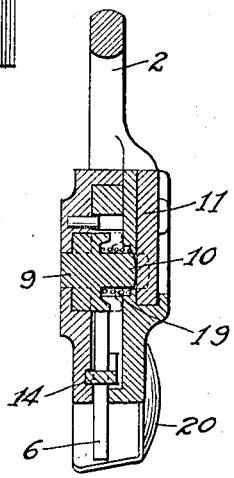
Figure 5:
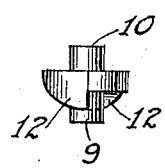

Figure 1 is a front view of one form of lock embodying the invention; Fig. 2 is a similar view with a portion of the lock removed to expose the interior; Fig. 3 is a sectional view taken on line 3—3 of Fig. 1; Fig. 4 is a bottom view of the lock shown in Fig. 1; Fig. 5 is an end view of the cam lever.

Like numerals refer to like parts throughout the several figures.

I have shown my invention as applied to a pad lock, for purposes of illustration.

One of the objects of the invention is to provide a lock by means of which the bolt or hasp is locked in position in such a manner that to unlock it a frangible seal must be mutilated, thus making it apparent that the lock has been tampered with. The lock may be used on railway cars, mail sacks, or any other place where it is desired to ascertain whether or not the lock has been tampered with.

Referring now to the drawings, the casing or body 1 of the lock may be formed in any desired manner. As herein shown the hasp or shackle 2 is provided with a hook 3 which projects into the body 1. A bolt 4 within the body 1 engages the hook so as to prevent the shackle from being opened. A spring 5 normally presses the bolt 4 toward its locking position. This bolt has an inclined face so that the hook 3 may be moved past it. A controlling lever 6 has a part which projects through a slot 7 in the body 1, and is pivoted within said body in any desired manner. The controlling lever 6 has a lug 8 which engages the bolt 4 and moves it to its unlocking position when the lever is moved. This controlling lever has trunnions 9 and 10. The trunnion 9 fits into a depression in the body of the lock, and the trunnion 10 fits into a hole in the body of the lock opposite the frangible seal 11. Some means is provided for moving the projection 10 into contact with the frangible seal 11 before the bolt 4 is entirely retracted so as to mutilate or fracture the frangible seal, and make it plain that the lock has been tampered with.

As herein shown, the lever 6 is provided with cams or inclined faces 12 which fit into depressions in the body 1, said depressions having inclined faces so that when the lever 6 is moved in one direction these inclined faces cause the projection 10 to move outwardly, as shown in dotted lines in Fig. 3, so as to exert pressure on the frangible seal. This seal is arranged so that it may be slipped into position when the shackle is open, the shackle when locked holding it against removal, by a movement toward the shackle, there being engaging parts 13 which prevent removal laterally and downwardly. The slot 7 is preferably inclined so as to permit the handle portion of the controlling lever to rise as the projection 10 rises. This lever has preferably connected therewith in any desired manner a guard 14 which moves with it, and which protects the slot 7 so as to prevent anything from being inserted into the slot. As herein shown the guard 14 is provided with an opening through which the lever 6 passes. The bolt 4 is provided with a safety device, which consists of a pawl engaging a shoulder 16 on the bolt when the bolt is in its locking position, thus preventing the bolt from being opened by accident or by jarring, or the like. This safety device preferably has connected with it a spring 17 which engages the hook 3 of the shackle. The movement of the safety device is limited by the stop 18. The safety device is released by the controlling lever, or some part associated therewith so as to permit the bolt to be retracted by said lever. As herein shown the guard 14 engages the end of the pawl and moves it out of the way when the controlling lever is actuated. A spiral spring 19 is associated with the controlling lever 6 and tends normally to move it to its inoperative position, that is, the position where the projection 10 does not exert pressure upon the frangible seal 11, or project into the space occupied thereby. The projecting part of the controlling lever 6 is preferably provided with a protecting device 20 which prevents it from being accidentally moved by striking some object. This protecting device partially incloses it, as shown, but leaves it accessible so that it can be grasped and moved to unlock the lock.

In operating the device the shackle is opened and placed through the part it is desired to lock. It is then closed so as to be engaged by the bolt 4, as shown in Fig. 2, the frangible seal 11 being first placed in position from above. The locking of the shackle then prevents the removal of the seal because it forms an obstruction in its path. This seal may have associated therewith any desired letter, number, character or distinguishing feature, by means of which it can be recognized and differentiated from other seals, and made difficult to reproduce. The protecting device 20 is fastened to the lock casing and covers the end of the lever 6 when the seal is in position, so as to prevent said lever from being accidentally moved by striking against an obstruction. This protecting device is open at one side, as shown in Fig. 3, so that the lever 6 may be reached and moved when desired. The lock casing is preferably made up of two parts fastened together by rivets, or in any other desired manner, the separation being preferably along the inclined slot 7. The device is now locked in position and the end of the controlling lever protected by the protecting device 20. The only way now that the lock can be opened without destroying some part of it is by moving the controlling lever 6. The movement of this lever causes the projection 10, because of the inclined faces on the lever and the body of the lock, to move outwardly and exert pressure upon the frangible seal 11, and the parts are arranged so that this pressure becomes so great before the bolt 4 is retracted by the controlling part 8 that the frangible seal will be mutilated or fractured. When this mutilation or fracture occurs the further movement of the controlling lever moves the bolt 4 back, and at the same time the guard 14 strikes the pawl 15, thus moving it out of the way, and the spring thereon engaging the shackle causes the shackle to spring open.

It will thus be seen that there is here provided a simple construction whereby the lock cannot be tampered with without exposure, and wherein the bolt cannot by jarring or otherwise be accidentally moved to its unlocking position.

After the shackle has been once locked the lever may be moved back by hand to its initial position, or if the spring 19 is of sufficient strength, it will be automatically moved back when released.

It will be seen that the controlling lever 6 has a compound movement, one movement adapted to unlock the locking device or shackle, and the other adapted to mutilate the frangible seal. It will be noted that the lock comprises a body portion and a locking part which, in the particular construction shown, is the shackle 2, said locking part adapted to be held in its locking position, there being a frangible seal held against removal by said locking part, and a pivoted lever for unlocking said locking part, the movement of the lever unlocking the locking part and breaking the frangible seal.

I claim:

1. A lock comprising a shackle, a bolt adapted to engage the shackle and hold it in its locked position, a pivoted controlling lever adapted to actuate said bolt, a frangible seal held against removal by said shackle, and means for exerting pressure upon said frangible seal when the controlling lever is moved to unlock the shackle.

2. A lock comprising a shackle, a bolt adapted to engage the shackle and hold it in its locked position, a pivoted controlling lever adapted to actuate said bolt, a frangible seal held against removal by said shackle, a slot in the body of the lock through which the end of said lever projects, a guard connected with said lever for protecting said slot, and means for exerting pressure upon said frangible seal when the controlling lever is moved to unlock the shackle.

3. A lock comprising a body portion, a shackle, a bolt for locking the shackle, a safety device for preventing the accidental movement of said bolt, a frangible seal held against removal by said shackle, and means for exerting pressure upon said frangible seal in process of moving said bolt to its unlocking position.

4. A lock comprising a body portion, a shackle, a bolt for locking the shackle, a safety device for preventing the accidental movement of said bolt, a frangible seal held against removal by said shackle, and means for simultaneously exerting pressure upon said frangible seal and rendering said safety device inoperative during the process of moving said bolt to its unlocking position.

5. A lock comprising a body portion, a movable locking part engaging said body portion adapted to be held in its locking position, a frangible seal held against removal by said locking part, a pivoted lever for unlocking said locking part, and having a part which projects from said body portion, and means associated with said lever for exerting pressure on said frangible seal when the lever is moved about its pivotal point.

6. A lock comprising a body portion, a movable locking part adapted to be held in its locking position, a frangible seal held against removal by said locking part, a lever for unlocking said locking part separably movable with relation thereto and having an inclined face, an inclined face in the body of the lock opposed thereto, arranged so that when the lever is rocked it will be moved toward the frangible seal, a projection thereon adapted to engage said frangible seal, and a connection between said lever and the locking part.

7. A lock comprising a movable locking part engaging said body portion, a frangible seal held against removal by said locking part when in its locking position, a pivoted lever separate from and movable with relation to said locking part and having a compound movement, one movement adapted to unlock the locking part, and the other to mutilate said frangible seal.

8. A lock comprising a body portion, a locking part, a frangible seal held against removal by said locking part when in its locking position, a pivoted lever pivotally mounted within the body portion opposite said frangible seal and having two parts at an angle to each other adapted to project from the body portion, one opposite said seal so as to engage it, and the other at a point beyond the seal so as to act as a handle.

9. A lock comprising a locking part, a frangible seal held against removal when said locking part is in its locking position, a pivoted lever by means of which said locking part is controlled, and having a portion rigidly connected therewith and opposed to said seal, and means for moving said lever bodily toward the seal when the lever is moved to unlock the locking part so as to cause said opposed part to break the seal.

Signed at Chicago, Illinois, A. D. 1909.

LAWRENCE C. WEYAND.

Witnesses:
  EDNA K. REYNOLDS,
  SOPHIE B. WERNER.

---

Copies of this patent may be obtained for five cents each, by addressing the "Commissioner of Patents, Washington, D. C."